United States Patent
Onimatsu

(10) Patent No.: US 11,214,028 B2
(45) Date of Patent: Jan. 4, 2022

(54) TIRE VULCANIZING APPARATUS AND TIRE VULCANIZING METHOD

(71) Applicant: Sumitomo Rubber Industries, Ltd., Hyogo (JP)

(72) Inventor: Hiroyuki Onimatsu, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 22 days.

(21) Appl. No.: 16/823,991

(22) Filed: Mar. 19, 2020

(65) Prior Publication Data

US 2020/0316889 A1 Oct. 8, 2020

(30) Foreign Application Priority Data

Apr. 3, 2019 (JP) .............................. JP2019-071444

(51) Int. Cl.
*B29D 30/06* (2006.01)

(52) U.S. Cl.
CPC ..... *B29D 30/0629* (2013.01); *B29D 30/0662* (2013.01); *B29D 2030/063* (2013.01)

(58) Field of Classification Search
CPC ....................... B29D 30/0629; B29D 2030/063
See application file for complete search history.

(56) References Cited

U.S. PATENT DOCUMENTS

| | | | |
|---|---|---|---|
| 4,013,390 A | | 3/1977 | Moeller et al. |
| 5,208,044 A | * | 5/1993 | Miyata ................ B29C 33/48 425/32 |
| 5,676,980 A | * | 10/1997 | Gulka .................. B29C 33/005 425/40 |
| 6,318,985 B1 | * | 11/2001 | Heindel ............. B29D 30/0629 425/46 |
| 6,426,482 B1 | * | 7/2002 | Fike ................... B29D 30/0606 219/121.72 |
| 6,632,393 B2 | * | 10/2003 | Fike ..................... B29D 30/065 264/297.5 |
| 6,841,113 B2 | * | 1/2005 | Caretta .............. B29D 30/0601 264/326 |

(Continued)

FOREIGN PATENT DOCUMENTS

| | | |
|---|---|---|
| EP | 1 106 322 A1 | 6/2001 |
| EP | 2 246 169 A1 | 11/2010 |

(Continued)

OTHER PUBLICATIONS

The extended European search report issued by the European Patent Office dated Aug. 24, 2020, which corresponds to European Patent Application No. 20163472.2-1014 and is related to U.S. Appl. No. 16/823,991.

*Primary Examiner* — James P Mackey
(74) *Attorney, Agent, or Firm* — Studebaker & Brackett PC

(57) ABSTRACT

A tire vulcanizing apparatus includes a mold having a tread mold including a plurality of segments arranged in a tire circumferential direction, and upper and lower side molds. Each of the segments includes an upper segment portion and a lower segment portion which are divided up and down. The apparatus includes a segment supporting unit which supports the upper segment portion and the lower segment portion so as to be movable to the same side in a tire radial direction and opposite sides to each other in a tire axial direction.

18 Claims, 6 Drawing Sheets

(56) References Cited

U.S. PATENT DOCUMENTS

| | | | |
|---|---|---|---|
| 7,976,299 B2 * | 7/2011 | Sano | ................ B29D 30/0629 |
| | | | 425/46 |
| 8,282,372 B2 * | 10/2012 | Seko | ................ B29D 30/0629 |
| | | | 425/46 |
| 2017/0057295 A1 | 3/2017 | Kageyama et al. | |

FOREIGN PATENT DOCUMENTS

| JP | 58-211438 | * 12/1983 |
|---|---|---|
| JP | 2016-055820 A | 4/2016 |
| JP | 2016-196114 A | 11/2016 |

* cited by examiner

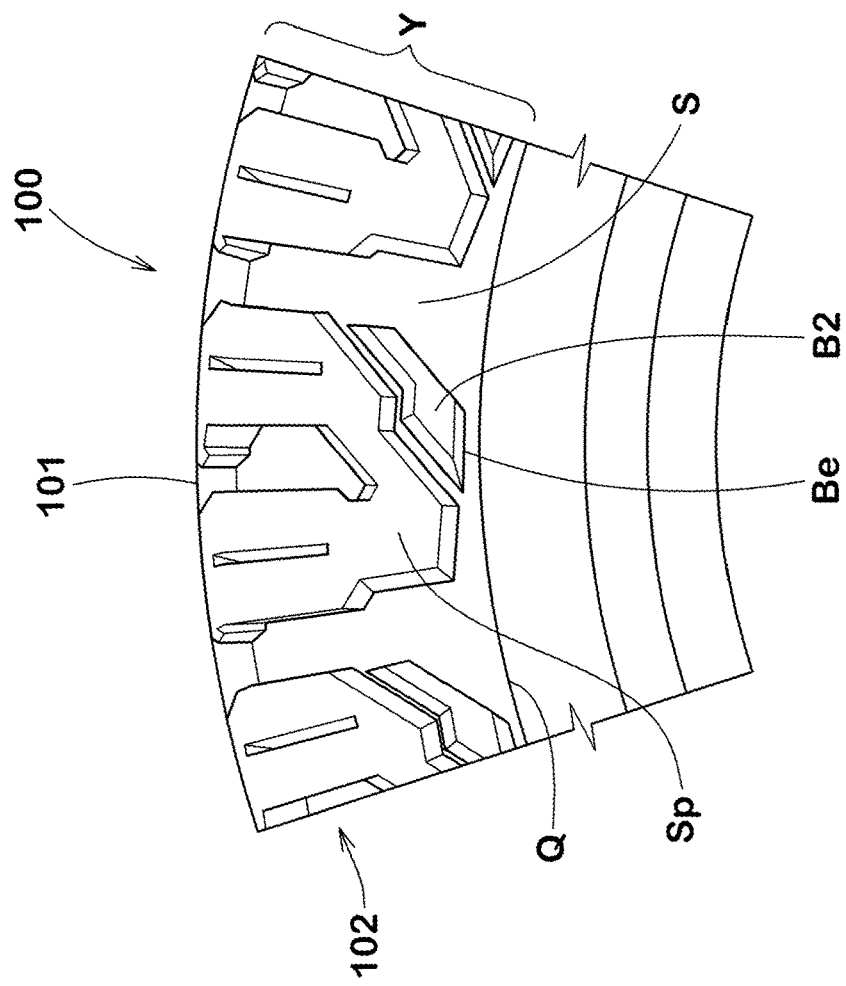
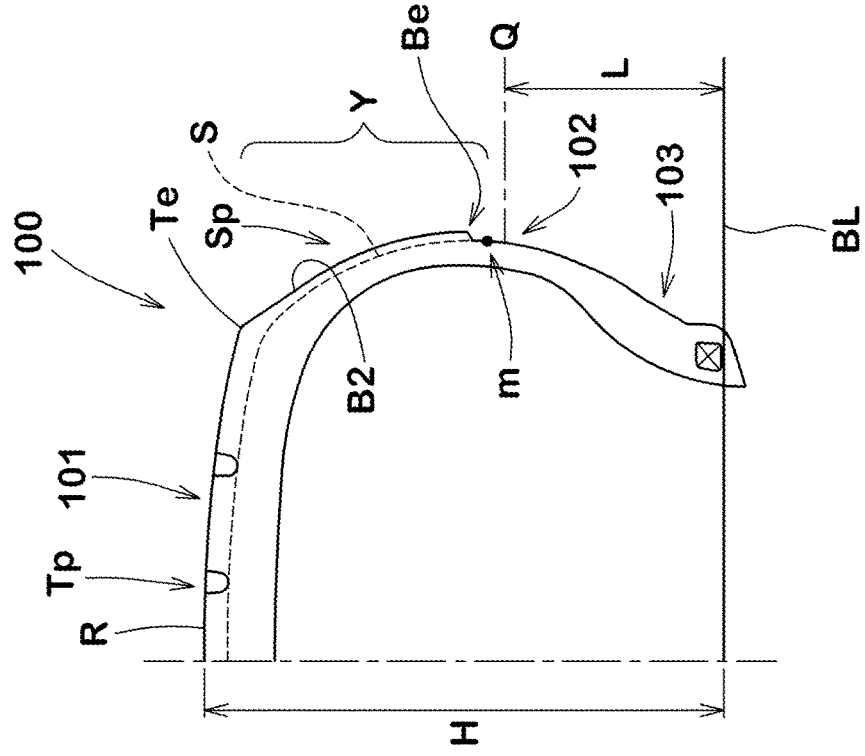
FIG.2A
FIG.2B

TIRE VULCANIZING APPARATUS AND TIRE VULCANIZING METHOD

TECHNICAL FIELD

The present invention relates to a tire vulcanizing method and a tire vulcanizing apparatus capable of shifting a split position between a side mold and a tread mold inwardly in a tire radial direction while enabling removal of a vulcanized tire from a mold.

BACKGROUND ART

For example, Patent Document 1 shown below has described a mold for vulcanizing and molding tires (hereinafter, may be referred to as a mold). The mold includes a side plate for forming sidewall portions, a tread forming ring for forming a tread portion, and an actuator ring that moves the tread forming ring in a radial direction. In a closed state of the mold, the tread forming ring and the side plate are connected.

On the other hand, for tires for four-wheel drive cars such as SUVs, for example, it has recently been proposed to provide blocks (hereinafter may be referred to as side blocks) also in a region in the vicinity of a tire maximum width position of the sidewall portion. (for example, see Patent Document 2). The side blocks configured as such improve traction performance on off-road and appearance.

PRIOR ART DOCUMENT

Patent Document

[Patent Document 1]
Japanese Unexamined Patent Application Publication No. 2016-196114
[Patent Document 2]
Japanese Unexamined Patent Application Publication No. 2016-55820

SUMMARY OF THE INVENTION

Problems to be Solved by the Invention

However, when a tire having the side blocks is vulcanized and molded by using the mold as described above, a parting line of the mold is generated on the surfaces of the side blocks, therefore, it is possible that the appearance of the tire is impaired. The parting line is a protruding mold mark generated at a split position between the tread forming ring and the side plate.

As a countermeasure for this, the present inventor has proposed that the parting line be made less noticeable by shifting the split position to radially inside the side blocks. However, in the mold in which the split position is simply shifted to radially inside the side blocks, when the mold is opened, the tread forming ring is caught on the side blocks, therefore, it is possible that the tire cannot be removed from the mold.

Accordingly, an object of the present invention is to provide a tire vulcanizing apparatus and a tire vulcanizing method capable of shifting the split position between the side mold and the tread mold inwardly in the tire radial direction while enabling removal of a vulcanized tire from the mold.

Means for Solving the Problems

The present invention is a tire vulcanizing apparatus including a mold having a tread mold comprising a plurality of segments arranged in a tire circumferential direction, and upper and lower side molds, wherein each of the segments includes an upper segment portion and a lower segment portion which are divided up and down, the apparatus includes a segment supporting unit which supports the upper segment portion and the lower segment portion so as to be movable to the same side in a tire radial direction and opposite sides to each other in a tire axial direction.

In the tire vulcanizing apparatus according to the present invention, it is preferred that a distance in the tire radial direction between a bead baseline and a split position between the tread mold and the upper and the lower side molds is smaller than 50% of a tire section height.

In the tire vulcanizing apparatus according to the present invention, it is preferred that a split position between the tread mold and the upper and the lower side molds is positioned radially inside a tire maximum width position.

In the tire vulcanizing apparatus according to the present invention, it is preferred that the apparatus includes an upper plate arranged above the upper segment portion with a distance therebetween in a closed state of the mold, wherein the segment supporting unit includes a first moving device which makes the upper segment portion come close to or come into contact with the upper plate when the upper segment portion is moved outward in the tire radial direction from the closed state.

In the tire vulcanizing apparatus according to the present invention, it is preferred that the segment supporting unit includes a second moving device which moves the upper segment portion outward in the tire radial direction from the closed state.

In the tire vulcanizing apparatus according to the present invention, it is preferred that the second moving device includes an actuator ring movable in the tire axial direction, and the upper segment portion has an upper inclined surface inclined downward as it goes outward in the tire radial direction on an outer surface on an outer side in the tire radial direction of the upper segment portion.

In the tire vulcanizing apparatus according to the present invention, it is preferred that the second moving device moves the lower segment portion outward in the tire radial direction from the closed state, and the lower segment portion has a lower inclined surface (13a) which is connected with the actuator ring and inclined downward as it goes outward in the tire radial direction on an outer surface of the lower segment portion on an outer side in the tire radial direction.

In the tire vulcanizing apparatus according to the present invention, it is preferred that the apparatus includes a lower plate which supports the lower segment portion, wherein an upper surface of the lower plate includes a support surface which supports a lower surface of the lower segment portion when the lower segment portion is moved outward in the tire radial direction from the closed state of the mold, and the support surface is inclined downward as it goes outward in the tire radial direction.

The present invention is a tire vulcanizing method for vulcanizing a green tire by a mold including a tread mold comprising a plurality of segments arranged in a tire circumferential direction and upper and lower side molds, and each of the segments including an upper segment portion and a lower segment portion which are divided up and down, wherein the method includes a tire removal step of removing the vulcanized tire from the mold after vulcanization, the tire removal step includes a first movement in which the upper segment portion and the lower segment portion are moved outward in a tire radial direction in a closed state of the mold, and a second movement in which the upper segment portion and the lower segment portion are moved so as to be separated from each other in a tire axial direction.

In the tire vulcanizing method according to the present invention, it is preferred that the first movement and the second movement are performed in parallel.

Effects of the Invention

The tire vulcanization apparatus of the present invention includes the mold having the tread mold including a plurality of the segments arranged in the tire circumferential direction, and the upper and the lower side molds. Each of the segments includes the upper segment portion and the lower segment portion which are divided up and down. The tire vulcanization apparatus of the present invention further includes the segment supporting unit which supports the upper segment portion and the lower segment portion so as to be movable to the same side in the tire radial direction and opposite sides to each other in the tire axial direction.

Thereby, even in the case of vulcanizing a tire in which the split position is shifted to radially inside the side blocks, for example, the tread mold can be moved outward in the tire radial direction without getting caught on the side blocks. That is, the tire vulcanizing apparatus of the present invention can mold a tire having good appearance, particularly a tire having no parting line on the surfaces of the side blocks, and the tire can be removed from the mold after vulcanization molding.

BRIEF DESCRIPTION OF THE DRAWINGS

FIG. 2A A cross-sectional view of a tire formed by the tire vulcanizing apparatus of FIG. 1.

FIG. 2B A side view of FIG. 2A.

MODE FOR CARRYING OUT THE INVENTION

An embodiment of the present invention will now be described in conjunction with accompanying drawings.

Figure 1:
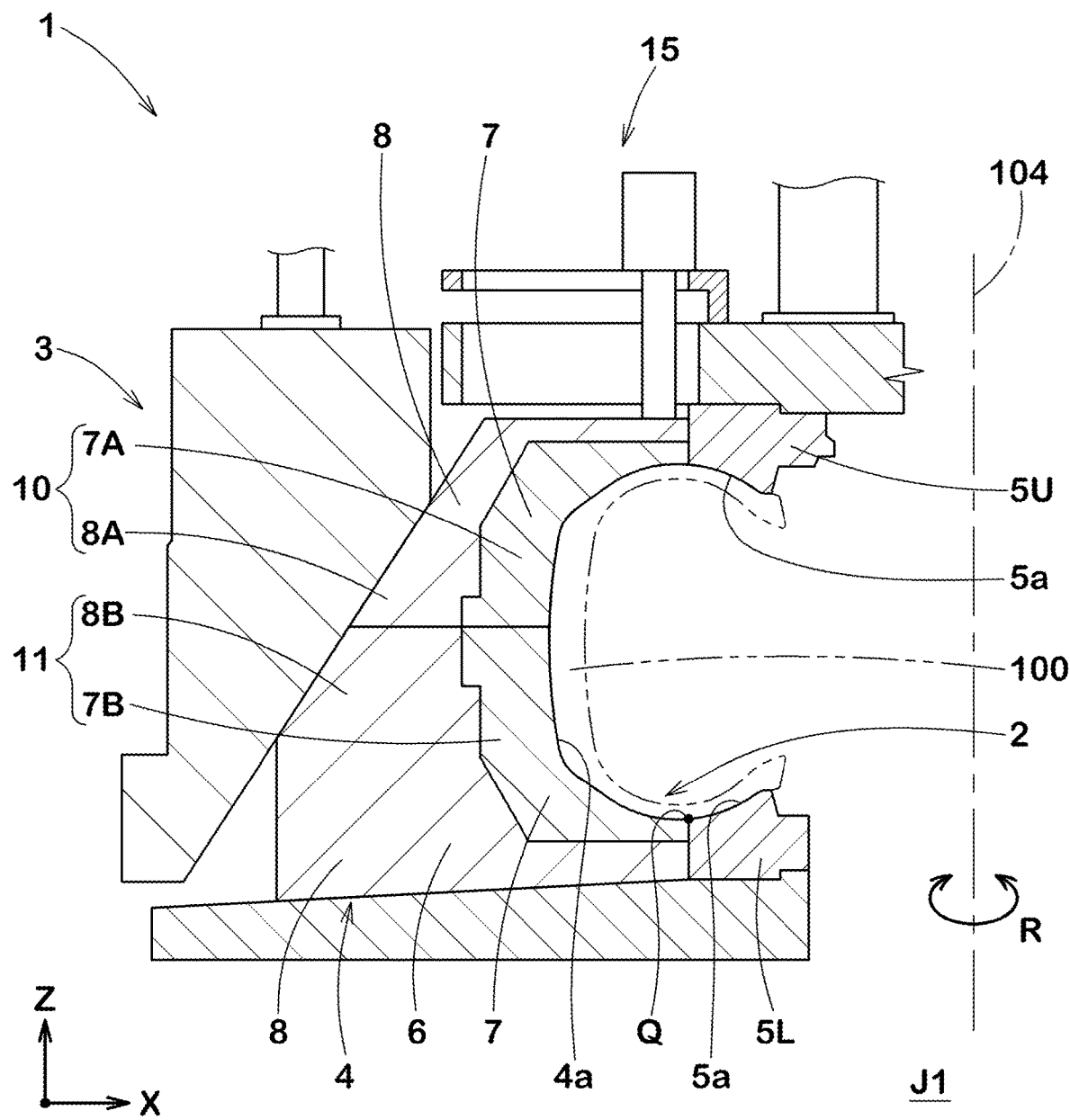
FIG. 1 A cross-sectional view of a principal part of a tire vulcanizing apparatus according to an embodiment of the present invention in a closed state.

FIG. 1 is a cross-sectional view of a principal part of a tire vulcanizing apparatus (hereinafter, may be simply referred to as "apparatus") 1 of the present embodiment (first embodiment). FIGS. 2A and 2B are a cross-sectional view and a side view of an embodiment of a vulcanized tire (hereinafter, may be simply referred to as "tire") 100 formed by the apparatus 1.

As shown in FIG. 2, the tire 100 according to the present embodiment is a tire for a four-wheel drive car such as an SUV. The tire 100 may be a heavy-duty tire, for example. In the present embodiment, the tire 100 includes a tread portion 101, sidewall portions 102 extending inwardly in a tire radial direction from both outer sides in a tire axial direction of the tread portion 101, and bead portions 103 each arranged radially inside a respective one of the sidewall portions 102.

The tire 100 has a well-known internal structure using a cord reinforcing layer (not shown) such as a carcass, a belt, a band, and the like.

In the tread portion 101, a tread pattern (Tp) including a plurality of block rows (R) extending in a tire circumferential direction is arranged, for example.

In radially outer regions (Y) of the sidewall portions 102, a side pattern (Sp) formed by side blocks (B2) is formed in order to improve the traction performance in off-the-road, for example. The side blocks (B2) are protrusions protruding from surfaces (S) of the sidewall portions 102. The side blocks (B2) are formed so as to include tread edges (Te), for example. Shapes, protrusion heights, and the like of the side blocks (B2) can be appropriately set according to the tire size and the like.

The radially outer regions (Y) each means a region located radially outside a respective one of tire maximum width positions (m). The tire maximum width positions (m) are positions where the surfaces (S) of the sidewall portions 102 protrude most outward in the tire axial direction except for protrusions such as characters and rim protectors provided on the sidewall portions 102.

As shown in FIG. 1, the apparatus 1 includes a mold 2 positioned outside the tire 100 and an apparatus main body 3 which supports the mold 2 so that the mold 2 can be opened and closed, for example. It should be noted that, in the present specification, a state in which the mold 2 can vulcanize and mold an unvulcanized green tire (not shown) is referred to as a closed state (J1). Further, a state in which the green tire can be put in the mold 2 and the vulcanized tire 100 can be removed is referred to as an open state (J2) (shown in FIG. 6).

The mold 2 of the present embodiment includes an annular tread mold 4 capable of expanding and contracting in the tire radial direction, and upper and lower side molds (5U) and (5L).

In the present specification, the tire radial direction, the tire axial direction, and the tire circumferential direction of the mold 2 mean the radial direction, the axial direction, and the circumferential direction of the tire 100 contained in the mold 2, respectively, and are indicated as (X), (Z), and (R), respectively. Further, in the present embodiment, the tire axial direction matches the vertical direction (up and down direction). Reference numeral 104 denotes a tire rotational axis.

The tread mold 4 has a molding surface (4a) for forming the tread pattern (Tp) and the side pattern (Sp), for example. Each of the upper side mold (5U) and the lower side mold (5L) has a molding surface (5a) for forming a portion, which is radially inside a split position (Q), of the sidewall portions 102 and a respective one of the bead portions 103, for example. The split position (Q) is the boundary position between the upper and lower side molds (5U) and (5L) and the tread mold 4 and which contacts the outer surface of the tire 100.

As shown in FIG. 2, the split position (Q) in the present embodiment is located at least radially inside radially inner ends (Be) of the side blocks (B2). It is preferred that a distance (L) in the tire radial direction between a bead baseline (BL) and the split position (Q) is smaller than 50% of a tire section height (H). Further, it is preferred that the split positions (Q) are positioned radially inside the tire maximum width positions (m). The present invention can be most effective for the mold 2 having the split positions (Q) configured as such.

As shown in FIG. 1, the tread mold 4 is composed of a plurality of segments 6 arranged in the tire circumferential direction, for example. In the present embodiment, each of the segments 6 includes an upper segment portion 10 and a lower segment portion 11 which are divided up and down.

Further, the tread mold 4 in the present embodiment includes a tread molding ring 7 which comes into contact with the tire 100 and a sector shoe 8 for opening and closing the tread molding ring 7. Each of the tread molding ring 7 and the sector shoe 8 is formed in a ring shape. The tread molding ring 7 has the molding surface (4a), for example.

The tread molding ring 7 of the present embodiment includes a plurality of upper ring pieces (7A) and lower ring pieces (7B) which are divided vertically and circumferentially. Further, the sector shoe 8 of the present embodiment includes a plurality of upper sector pieces (8A) and lower sector pieces (8B) which are divided vertically and circumferentially. In the present embodiment, the upper segment portion 10 is formed by the upper ring pieces (7A) and the upper sector pieces (8A). Further, the lower segment portion 11 is formed by the lower ring pieces (7B) and the lower sector pieces (8B).

Figure 3:
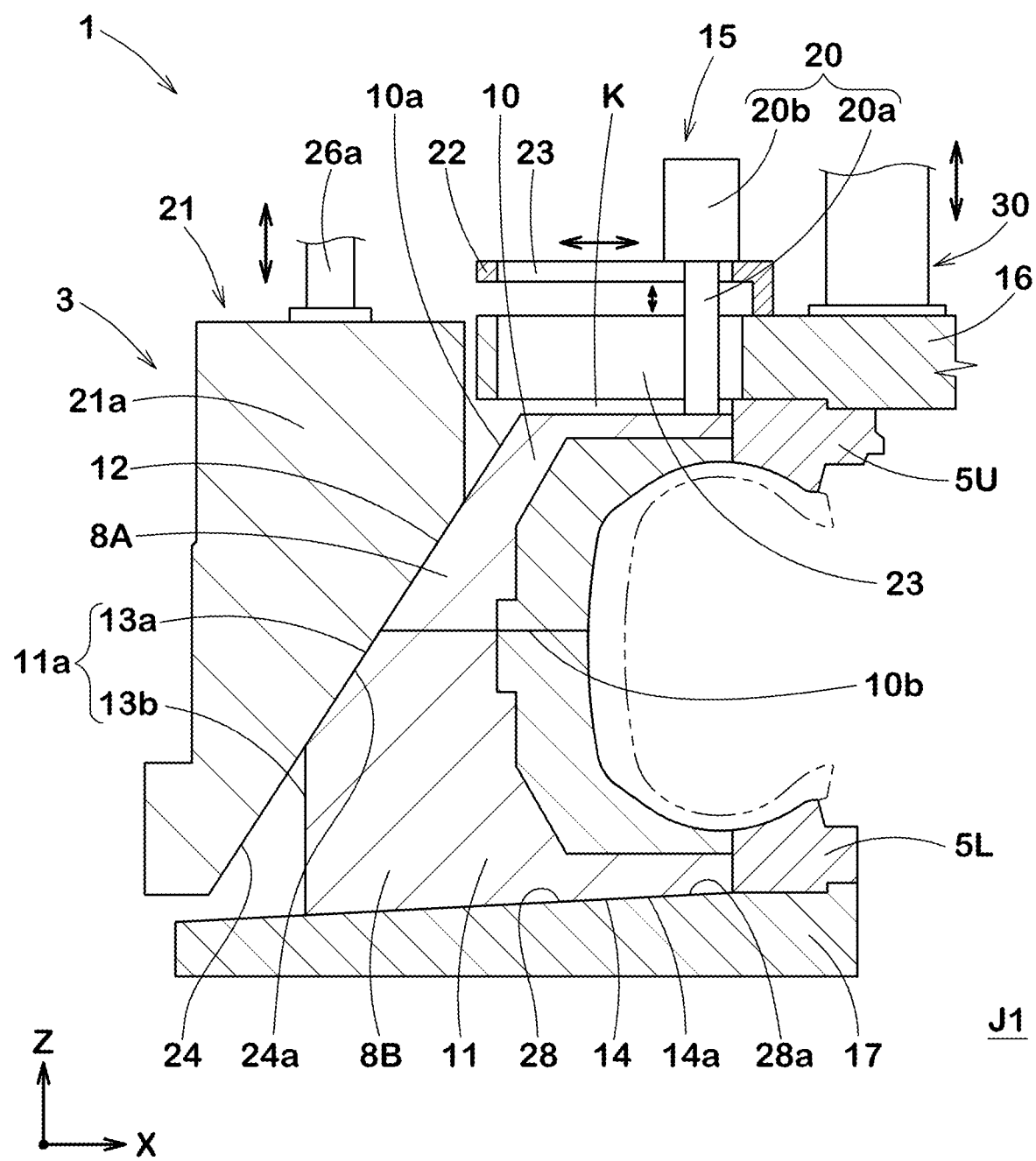
FIG. 3 A cross-sectional view of a principal part of the tire vulcanizing apparatus in the closed state.

FIG. 3 is a cross-sectional view of a principal part of the apparatus 1. As shown in FIG. 3, the upper segment portion 10 has an upper inclined surface 12 that is inclined downward as it goes outwardly in the tire radial direction on an outer surface (10a) on an outer side in the tire radial direction, for example. The upper inclined surface 12 of the present embodiment is formed in the upper sector pieces (8A). The lower segment portion 11 has, on an outer surface (11a) positioned on the radially outer side, a lower inclined surface (13a) which is inclined downward as it goes outwardly in the tire radial direction and a lower axial surface (13b) extending downward from the lower inclined surface (13a) along the tire axial direction, for example. Further, the upper segment portion 10 has a contact surface (10b) that comes into contact with the lower segment portion 11. The contact surface (10b) in the present embodiment is formed parallel to the tire radial direction (horizontally). It should be noted that the contact surface (10b) is not limited to being formed parallel to the tire radial direction.

The lower segment portion 11 in the present embodiment has an inclined surface (14a) which is inclined downward as it goes outwardly in the tire radial direction on a lower surface 14 facing downward. The lower inclined surface (13a), the lower axial surface (13b), and the inclined surface (14a) of the present embodiment are formed in the lower sector pieces (8B).

The apparatus main body 3 in the present embodiment includes a segment supporting unit 15 which movably supports the upper segment portion 10 and the lower segment portion 11, an upper plate 16 which supports the upper side mold (5U), and a lower plate 17 which supports the lower side mold (5L).

In the closed state (J1) of the mold 2, a gap (K) extending in the tire radial direction is provided between the upper plate 16 and the upper segment portion 10. That is, in the closed state (J), the upper plate 16 and the upper segment portion 10 are separated in the tire axial direction.

The segment supporting unit 15 includes a first moving device 20 and a second moving device 21, for example.

The first moving device 20 is a well-known cylinder mechanism having a rod (20a) and a cylinder (20b) that supports the rod (20a) so as to be able to expand and contract, for example. The upper segment portion 10 is fixed to the tip of the rod (20a). The cylinder (20b) is held by a holding member 22 fixed to the upper plate 16, for example. The first moving device 20 in the present embodiment is held so as to be movable in the tire radial direction by a guide hole 23 extending in the tire radial direction and provided in the upper plate 16 and the holding member 22.

The second moving device 21 in the present embodiment includes an actuator ring (21a) that can move in the tire axial direction.

The actuator ring (21a) has an inner surface 24 positioned on the inner side in the tire radial direction. The inner surface 24 includes a downward inclined surface (24a) inclined downward as it goes outward in the tire radial direction. The downward inclined surface (24a) is connected with the upper inclined surface 12 and the lower inclined surface (13a) by a guide portion (not shown) having a well-known structure, for example. As a result, the actuator ring (21a) can move relative to the upper segment portion 10 and the lower segment portion 11. It should be noted that it is preferred that a well-known retaining member for preventing the downward inclined surface (24a) from coming off the lower inclined surface (13a) is provided in the guide portion.

The actuator ring (21a) in the present embodiment is fixed to a rod (26a) which expands and contracts in the tire axial direction. The rod (26a) is held so as to be able to expand and contract by a cylinder portion (not shown) having a well-known structure, for example.

The lower plate 17 in the present embodiment has an upper surface 28 facing upward. The upper surface 28 of the present embodiment includes a support surface (28a) that supports the lower surface 14 of the lower segment portion 11. The support surface (28a) is inclined downward as it goes outward in the tire radial direction, for example. The support surface (28a) in the present embodiment is inclined at the same angle as the inclined surface (14a). Thereby, for example, when the actuator ring (21a) moves upward, the lower segment portion 11 can slide downward due to its own weight while moving outward in the tire radial direction.

Further, the apparatus main body 3 has a lifting and lowering unit 30 for moving the upper plate 16 in the vertical direction, for example. The lifting and lowering unit 30 of the present embodiment is fixed to the upper plate 16. The lifting and lowering unit 30 axially moves the upper segment portion 10, the lower segment portion 11, the first moving device 20, the second moving device 21, the upper plate 16, and the upper side mold (5U) relative to the lower plate 17 and the lower side mold (5L), for example. It is preferred that the lifting and lowering unit 30 is an actuator such as a cylinder mechanism or a ball screw mechanism having a well-known structure, for example.

Next, a tire vulcanizing method using the apparatus 1 will be described. The tire vulcanizing method of the present embodiment includes a step of arranging the green tire in the mold 2 in the open state (J2), a step of vulcanizing the green tire arranged in the mold 2 in the closed state (J1), and a tire removal step of removing the vulcanized tire 100 from the mold 2 after the vulcanization. Among these, the step of arranging the green tire and the step of vulcanizing the green tire are the same as the conventional vulcanization method. Therefore, the description of these two steps will be omitted, and only the tire removal step will be described below.

Figure 4:
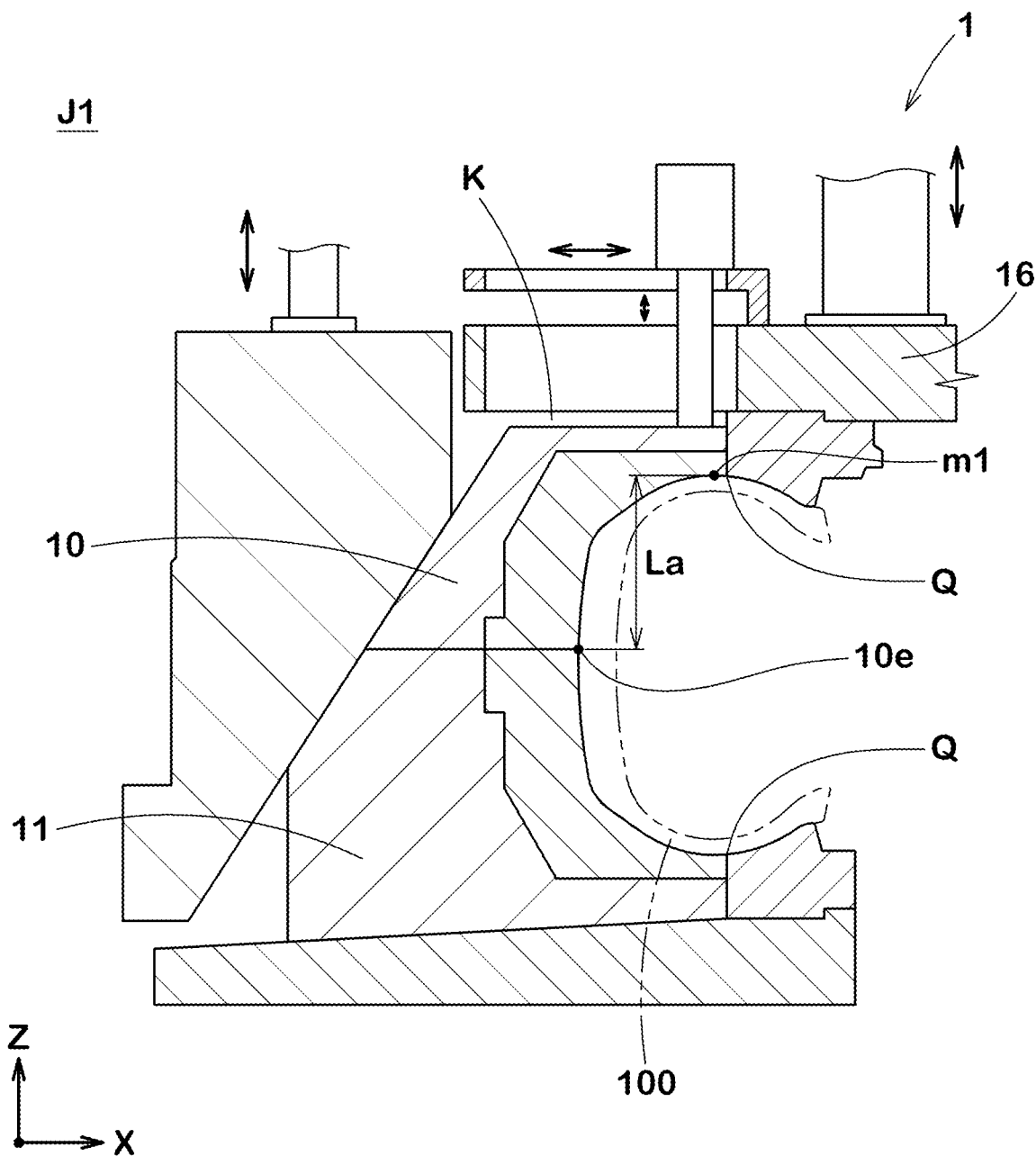
FIG. 4 A cross-sectional view conceptionally showing the closed state of a removal step.
Figure 5:
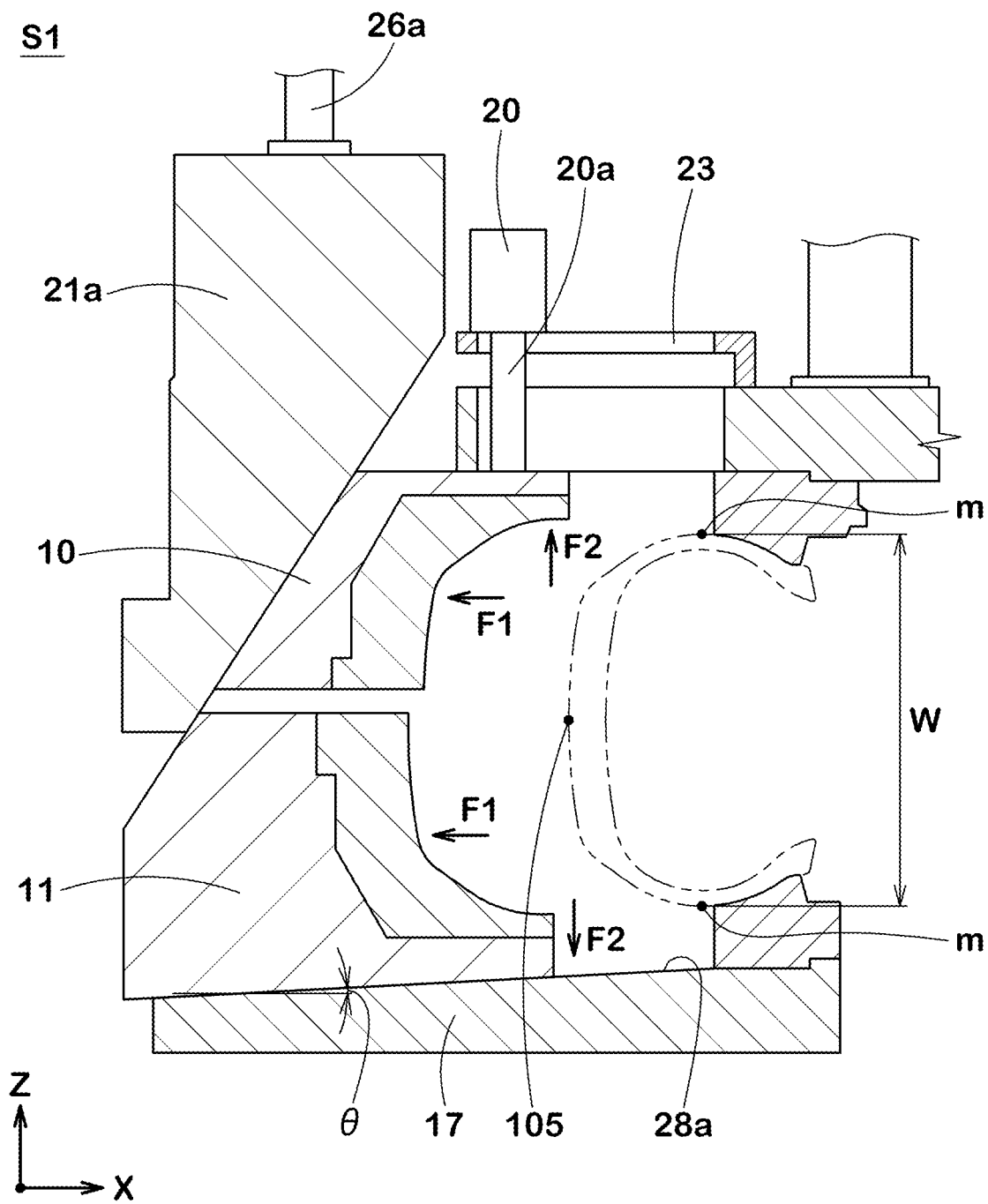
FIG. 5 A cross-sectional view conceptionally showing a first stage of the removal step.
Figure 6:
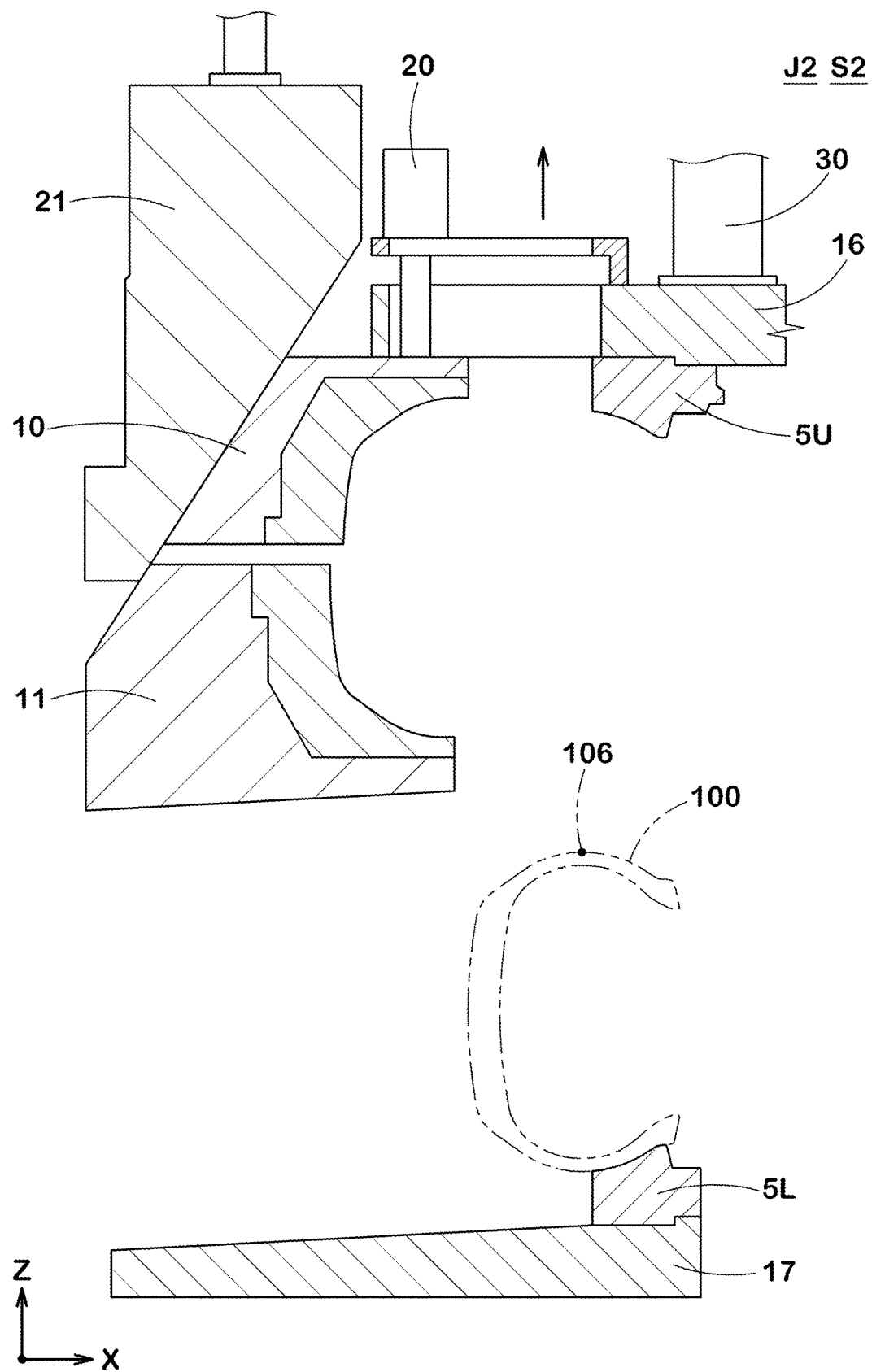
FIG. 6 A cross-sectional view conceptionally showing a second stage of the removal step.

FIG. 4 is a cross-sectional view conceptionally showing the closed state (J1) immediately after vulcanization molding of the tire 100 is completed. FIG. 5 is a cross-sectional view conceptionally showing a first stage (S) in the tire removal step, and FIG. 6 is a cross-sectional view conceptionally showing a second stage (S2) in the tire removal step.

As shown in FIG. 4, the gap (K) is provided between the upper segment portion 10 and the upper plate 16 in the closed state (J1). Further, the split position (Q) in the present embodiment is arranged radially inside the side blocks (B2) and the tire maximum width positions (m).

As shown in FIG. 5, the first stage (S1) includes a first movement (F1) and a second movement (F2). In the first movement (F1), in the present embodiment, the upper segment portion 10 and the lower segment portion 11 are moved outward in the tire radial direction. In the second movement (F2), the upper segment portion 10 and the lower segment portion 11 are moved in a direction such that they are separated from each other in the tire axial direction.

In order to realize the first movement (F1) and the second movement (F2) as just described, in the present embodiment, the first movement (F1) and the second movement (F2) are performed in parallel. In the present embodiment, the first moving device 20 and the second moving device 21 are operated at a predetermined timing, for example, simultaneously. That is, at the same time the actuator ring (21a) is moved upward by the rod (26a), the upper segment portion 10 is moved upward, by the first moving device 20, so as to come close to or come into contact with the upper plate 16 while separating from the tire 100. As a result, the upper segment portion 10 is moved in a distance of the gap (K) while being guided in the tire radial direction by the guide hole 23, therefore, the upper segment portion 10 is moved outward in the tire radial direction without getting caught on the side blocks (B2) (shown in FIG. 2) of the tire 100. Further, the lower segment portion 11 is moved outward in the tire radial direction and downward as it slides down on the support surface (28a) of the lower plate 17 by its own weight without getting caught on the side blocks (B2).

Although, an angle θ of the support surface (28a) with respect to the tire radial direction is determined by the relationship between the split positions (Q) and the tire maximum width positions (m), the angle θ is preferably 5 degrees or more and 15 degrees or less, and more preferably 8 degrees or more and 12 degrees or less.

It is preferred that a distance (La) (shown in FIG. 4) in the tire axial direction between an upper tire maximum width position (m1) and a lower end (10e) in the vertical direction where the upper segment portion 10 contacts the tire 100 is 40% or more and 60% or less of a tire section width (W), for example. If the distance (La) is less than 40% or more than 60% of the tire section width (W), it is possible that the side blocks (B2) of the tire 10 and the tread mold 4 get caught on each other at the time of the first movement (F1) and the second movement (F2). The tire section width (W) is a length in the tire axial direction between the tire maximum width positions (m) and (m) of the tire 100 in the mold 2. The upper tire maximum width position (m1) is the uppermost tire maximum width position (m) of the tire 100 in the mold 2.

As described above, in the present embodiment, it is preferred that the first moving device 20 and the second moving device 21 are controlled by, for example, a control unit (not shown) such as a computer so as to be able to operate at a predetermined timing. It is preferred that the control unit can control the speed of movement of the actuator ring (21a)(rod (26a)) and the speed of movement of the upper segment portion 10 (rod (20a)), for example.

In the first stage (S), the upper segment portion 10 and the lower segment portion 11 are moved to radially outside an outer end 105 in the tire radial direction of the tire 100, for example.

As shown in FIG. 6, in the second stage (S2), the lifting and lowering unit 30 moves the upper segment portion 10, the lower segment portion 11, the first moving device 20, the second moving device 21, the upper plate 16, and the upper side mold (5U) upward to the position where the open state (J2) is reached. The lower segment portion 11 in the present embodiment is positioned above an upper end 106 in the vertical direction of the tire 100. Thereby, it is possible that the tire 100, in which the split position (Q) is disposed radially inside the side blocks (B2), can be removed from the mold 2.

Next, a tire vulcanizing method according to another embodiment using the apparatus 1 will be described. The description of the same configuration as that of the present embodiment is omitted. In this embodiment, the lifting and lowering unit 30 is configured to be able to be lowered downward from the closed state (J1) shown in FIG. 4. The lifting and lowering unit 30 is lowered downward from the closed state (J1) shown in FIG. 4, and the upper plate 16 and the upper side mold (5U) are lowered by a distance corresponding to an axial length of the gap (K). Thereby, since the sidewall portion 102 of the tire 100 is pressed downward by the upper side mold (5U), the upper segment portion 10 can be moved outward in the tire radial direction without being caught on the side blocks (B2) (not shown).

Further, a tire vulcanizing method according to yet another embodiment using the apparatus 1 will be described. The description of the same configuration as that of the present embodiment is omitted. In this embodiment, the lifting and lowering unit 30 is configured to be able to be lowered downward from the closed state (J1) shown in FIG. 4. In this embodiment, the lifting and lowering unit 30 is lowered from the closed state (J1) shown in FIG. 4 and, at the same time, the upper segment portion 10 is moved upward by the first moving device 20 to eliminate the gap (K). Thereby, it is possible that the upper segment portion 10 is separated from the side blocks (B2) while pressing down the sidewall portion 102 of the tire 100. Therefore, the upper segment portion 10 can be moved outward in the tire radial direction without being caught on the side blocks (B2) (not shown).

While detailed description has been made of especially preferred embodiments of the present invention, the present invention can be embodied in various forms without being limited to the illustrated embodiments.

DESCRIPTION OF REFERENCE SIGNS 1 tire vulcanizing apparatus
2 mold
4 tread mold
5L lower side mold
5U upper side mold
6 segment
10 upper segment portion
11 lower segment portion
15 segment supporting unit

The invention claimed is:
1. A tire vulcanizing apparatus including a mold having a tread mold comprising a plurality of segments arranged in a tire circumferential direction, and upper and lower side molds, wherein
each of the segments includes an upper segment portion and a lower segment portion which are divided up and down,
the apparatus includes
a segment supporting unit which supports the upper segment portion and the lower segment portion so as to be movable to the same side in a tire radial direction and opposite sides to each other in a tire axial direction, and a lower plate which supports the lower segment portion, wherein an upper surface of the lower plate includes a support surface which supports a lower surface of the lower segment portion when the lower segment portion is moved outward in the tire radial direction from the closed state of the mold, and the support surface is inclined downward as it goes outward in the tire radial direction.

2. The tire vulcanizing apparatus according to claim 1, wherein a distance in the tire radial direction between a bead baseline and a split position between the tread mold and the upper and the lower side molds is smaller than 50% of a tire section height.

3. The tire vulcanizing apparatus according to claim 1, wherein a split position between the tread mold and the upper and the lower side molds is positioned radially inside a tire maximum width position.

4. The tire vulcanizing apparatus according to claim 1 including an upper plate arranged above the upper segment portion with a distance therebetween in a closed state of the mold, wherein the segment supporting unit includes a first moving device which makes the upper segment portion come close to or come into contact with the upper plate when the upper segment portion is moved outward in the tire radial direction from the closed state.

5. The tire vulcanizing apparatus according to claim 4, wherein the segment supporting unit includes a second moving device which moves the upper segment portion outward in the tire radial direction from the closed state.

6. The tire vulcanizing apparatus according to claim 5, wherein the second moving device includes an actuator ring movable in the tire axial direction, and the upper segment portion has an upper inclined surface inclined downward as it goes outward in the tire radial direction on an outer surface on an outer side in the tire radial direction of the upper segment portion.

7. The tire vulcanizing apparatus according to claim 6, wherein the second moving device moves the lower segment portion outward in the tire radial direction from the closed state, and the lower segment portion has a lower inclined surface (13a) which is connected with the actuator ring and inclined downward as it goes outward in the tire radial direction on an outer surface of the lower segment portion on an outer side in the tire radial direction.

8. The tire vulcanizing apparatus according to claim 1, wherein the tread mold has a molding surface for forming side blocks on a sidewall portion of the tire, and a split position between the tread mold and the upper and the lower molds is positioned radially inside innermost ends in the tire radial direction of the side blocks.

9. The tire vulcanizing apparatus according to claim 1, wherein the lower segment portion has an inclined surface on a lower surface facing downward of the lower segment portion, and the inclined surface is inclined downward as it goes outward in the tire radial direction.

10. The tire vulcanizing apparatus according to claim 6, wherein the actuator ring has an inner surface positioned on an inner side in the tire radial direction, and the inner surface includes a downward inclined surface inclined downward as it goes outward in the tire radial direction.

11. The tire vulcanizing apparatus according to claim 5, wherein the first moving device and the second moving device are operated simultaneously.

12. The tire vulcanizing apparatus according to claim 1, wherein an angle of the support surface with respect to the tire radial direction is 5 degrees or more and 15 degrees or less.

13. The tire vulcanizing apparatus according to claim 1, wherein a distance in the tire axial direction between a tire maximum width position and a lower end in the vertical direction of the upper segment portion where the upper segment portion contacts the tire is 40% or more and 60% or less of a tire section width.

14. A tire vulcanizing method for vulcanizing a green tire by a mold including a tread mold comprising a plurality of segments arranged in a tire circumferential direction and upper and lower side molds, and each of the segments including an upper segment portion and a lower segment portion which are divided up and down, the lower segment portion being slidably movable along an upper surface of a lower plate which is inclined downwardly and radially outward, wherein the method includes a tire removal step of removing the vulcanized tire from the mold after vulcanization, the tire removal step includes a first movement in which the upper segment portion and the lower segment portion are moved along the upper surface of the lower plate outward in a tire radial direction in a closed state of the mold, and a second movement in which the upper segment portion and the lower segment portion are moved so as to be separated from each other in a tire axial direction.

15. The tire vulcanizing method according to claim 14, wherein the first movement and the second movement are performed in parallel.

16. The tire vulcanizing method according to claim 14, wherein the tire removal step includes a first stage, and in the first stage, the upper segment portion and the lower segment portion are moved to radially outside an outer end in the tire radial direction of the tire.

17. The tire vulcanizing method according to claim 16, wherein the tire removal step includes a second stage, and in the second stage, the upper segment portion, the lower segment portion, and the upper side mold are moved upward to reach an open state of the mold.

18. The tire vulcanizing method according to claim 14, wherein the tire removal step includes, prior to the first movement, lowering the upper side mold so as to press the tire downward.

\* \* \* \* \*